Feb. 9, 1971  P. A. MERIGOLD  3,561,844
OPTICAL OBJECTIVES OF VARIABLE EQUIVALENT FOCAL LENGTH
HAVING TWO MOVABLE DIVERGENT MEMBERS
Filed June 29, 1966
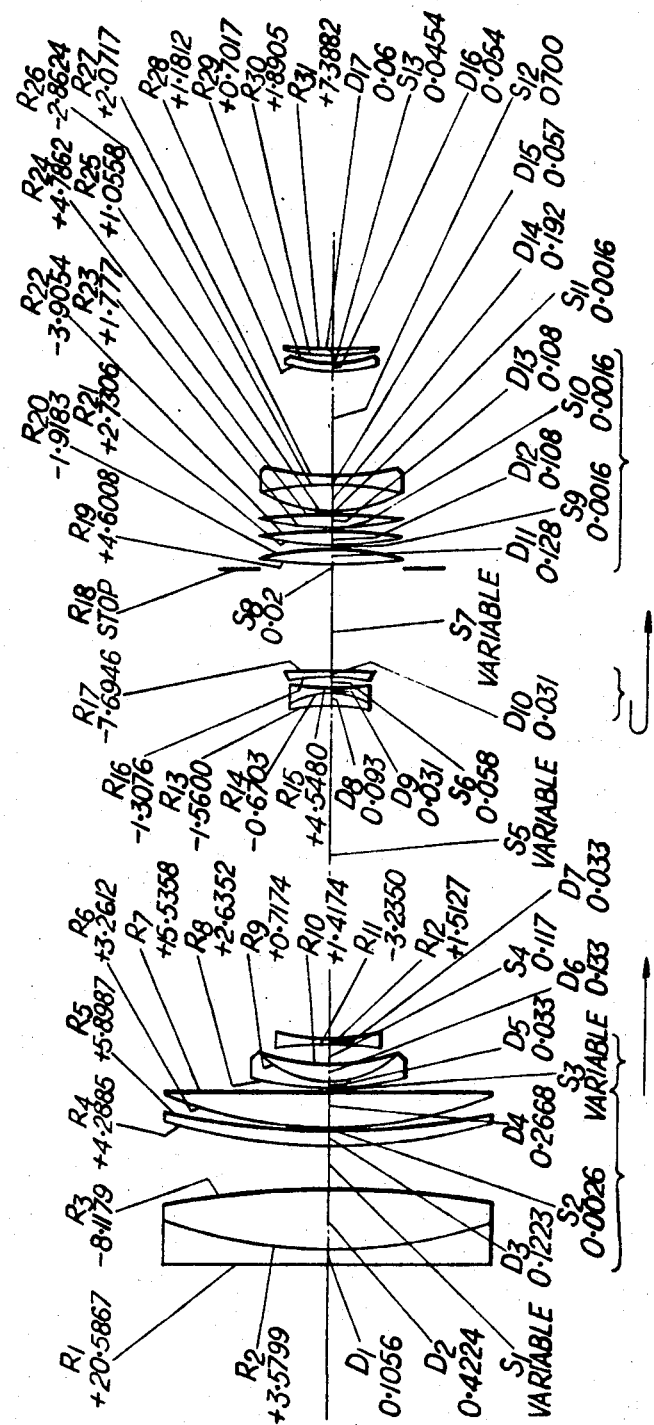

United States Patent Office 3,561,844
Patented Feb. 9, 1971

3,561,844
OPTICAL OBJECTIVES OF VARIABLE EQUIVALENT FOCAL LENGTH HAVING TWO MOVABLE DIVERGENT MEMBERS
Peter Arnold Merigold, Prestatyn, Wales, assignor to The Rank Organisation Limited, London, England a British company
Filed June 29, 1966, Ser. No. 561,539
Claims priority, application Great Britain, June 29, 1965, 27,526/65
Int. Cl. G02b 15/16
U.S. Cl. 350—184                    13 Claims

ABSTRACT OF THE DISCLOSURE

A zoom lens mechanically corrected for aberrational deviations throughout the zooming range, said lens having a convergent front member stationary during zooming, divergent second and third members axially movable to effect zooming, and a stationary convergent rear member, the focal lengths of the second and third members together with their axial movements being determined within ranges to provide an increased zoom ratio and the constructions of the second and third members having parameters determined within ranges to provide improved stabilization of aberrations throughout the zooming range.

---

This invention relates to an optical objective of the "zoom" type, that is of the type having relatively movable members whereby under the control of a zoom control element the equivalent focal length of the objective can be continuously varied throughout a range, whilst maintaining constant position of the image plane, whereby the size of the image can be varied, the objective being corrected for spherical and chromatic aberrations, coma, astigmatism, field curvature and distortion throughout the range or variation. Accommodation for change of object position is usually achieved by imparting an additional movement to the front member of the objective under the control of a focussing control element.

One very difficult problem arising in the design of such objectives is to achieve a much-desired increase in the range of variation of the equivalent focal length, in such a manner as to make it possible to maintain a high standard of aberration correction throughout the increased range and without involving any great increase in the bulk and size of the complete objective or in the complexity of the necessary operating mechanism.

An important advance in the art in this respect has been achieved in accordance with the invention of the copending U.S. patent application Ser. No. 309,208 filed on Sept. 16, 1963, whereby it has proved possible to obtain an increase in the range of variation of equivalent focal length such that the maximum value thereof is ten times the minimum value thereof. The objective according to the invention of such co-pending application has four members, of which the first (counting from the front) is convergent and for a given object distance remains stationary during the zooming relative movement, the second and third are divergent and movable and the fourth is convergent and stationary, the minimum separation between the second and third members occurring when the equivalent focal length of the objective is greater than half its maximum value in the range of variation, whilst the equivalent focal lengths $f_B$ and $f_C$ respectively of the movable second and third members lie numerically respectively between 4 and 8 times the minimum value of the ratio of the equivalent focal length of the objective to the $f$-number of the objective in the range of variation and between 5 and 10 times such minimum ratio, the divergent movable second member consisting of a divergent simple meniscus component with its surface convex to the front followed by a divergent compound component and performing during the range of variation a total axial movement lying numerically between $1.5f_B$ and $2.5f_B$, whilst the divergent movable third member consists of a doublet component having a front surface concave to the front with radius of curvature lying numerically between $0.5f_C$ and $1.0f_C$ and performs during the range of variation a total axial movement lying numerically between $0.25f_C$ and $0.5f_C$.

It is to be understood that the terms "front" and "rear," as used herein, relate respectively to the sides of the objective nearer to and further from the longer conjugate in accordance with the usual convention.

It should also be made clear that the term "internal contact," when used hereinafter in connection with a compound component, is intended to include, not only a cemented contact, but also what is commonly known as a "broken contact," that is one in which the two contacting surfaces have slightly different radii of curvature, the effective radius of curvature of such a broken contact being the arithmetic mean between the radii of curvature of the individual contacting surfaces, whilst the optical power of the broken contact is the harmonic mean between the optical powers of the individual contacting surfaces.

The present invention has for its object to provide an improved objective of the zoom type, which retains some of the features of the objective according to the above-mentioned co-pending application, but enables a still further substantial increase in the range of variation of equivalent focal length to be achieved whilst maintaining good stability of aberration correction throughout the extended range of variation.

The optical objective according to the present invention has four members, of which the first (counting from the front) is convergent and for a given object distance remains stationary during the zooming relative movements, the second and third are divergent and movable, and the fourth is convergent and stationary, the minimum separation between the second and third members occurring when the equivalent focal length of the objective lies between a half and three-quarters of its maximum value in the range of variation, the equivalent focal lengths $f_B$ and $f_C$ respectively of the movable second and third members each lying between 3 and 6 times the minimum value of the ratio of the equivalent focal length of the objective to the $f$-number of the objective in the range of variation, the movable divergent second member consisting of a divergent compound component with its air-exposed surfaces convex to the front having equivalent focal length between $4f_B$ and $8f_B$ followed by a divergent simple component having equivalent focal length between $0.75f_B$ and $2f_B$, such second member performing in the range of variation a total axial movement lying numerically between $1.5f_B$ and $2.5f_B$, whilst the movable divergent third member consists of a divergent compound component having equivalent focal length between $1.5f_C$ and $3f_F$ followed by a divergent simple meniscus component with its surfaces concave to the front having equivalent focal length between $1.5f_B$ and $3f_C$, such third member performing in the range of variation a total axial movement lying numerically between $0.5f_C$ and $0.75f_C$. The term "total axial movement" herein used is intended to mean the axial distance between the positions occupied by a member at the two ends of the range of variation of equivalent focal length.

The characteristics of the movable second and third members above specified co-operate with one another to enable the residual aberrations generally to be maintained substantially stable throughout an extended range of variation of the equivalent focal length of the objective, the relationship between the equivalent focal lengths of the four components of such two members being more especially important for the stabilization of astigmatism and distortion throughout such extended range, whereby such stabilised aberrations can readily be balanced out by suitable design of the stationary fourth member.

For assisting in bringing the values of coma at intermediate points of the range of variation more into accordance with the values thereof at the two ends of the range, the front surface of the divergent simple component of the movable divergent second member is preferably concave to the front with radius of curvature lying numerically between 2 and 4 times the radius of curvature of the rear surface of the divergent compound component of such second member.

The divergent compound component of such second member is preferably a doublet component having a divergent element in front of a convergent element with a collective internal contact, the mean refractive index of the material of the rear element of such doublet component exceeding that of the front element thereof by between 0.05 and 0.20, whilst the Abbe V number of the material of the front element of such doublet component exceeds that of the rear element thereof by more than 25. This assists in the stabilisation of chromatic aberrations throughout the extended range of variation.

Further assistance in the stabilization of the spherical aberration, coma and astigmatism can be obtained, if the radius of curvature of the front surface of the divergent compound component of the second member lies numerically between $1.5f_B$ and $4f_B$, whilst the radius of curvature of the rear surface of such divergent compound lies numerically between $f_B$ and $2f_B$.

For assisting further towards stabilization of astigmatism, chromatic aberrations and field curvature, the arithmetic mean between the mean refractive indices of the materials of the divergent elements of the second member (that is, when the divergent compound component is arranged as above mentioned as a doublet component, the front element of such component and the divergent simple component) is preferably greater than 1.625, the arithmetic mean between the Abbe V numbers of such materials being greater than 50.

Turning now to the movable divergent third member, for assisting in stabilising chromic aberrations and astigmatism, the divergent compound component thereof is preferably a doublet component having a convergent element in front of a divergent element with a collective internal contact, the mean refractive index of the material of the front element of such doublet component exceeding that of the rear element thereof by between 0.05 and 0.20, whilst the Abbe V number of the material of the rear element of such doublet component exceeds that of the front element thereof by more than 25. The internal contact in such doublet component preferably has radius of curvature lying numerically between $0.25f_C$ and $f_C$, such contact being concave to the front, thereby assisting in stabilization of coma and astigmatism.

Further assistance in stabilizing coma may be obtained by making the rear surface of the divergent compound component of the movable divergent third member convex to the front with radius of curvature numerically between 2 and 5 times that of the front surface of the divergent simple meniscus component of such third member.

The arithmetic mean between the mean refractive indices of the materials of the divergent elements of the movable divergent third member (that is, when the divergent compound component thereof is arranged as above mentioned as a doublet component, the rear element of such doublet component and the divergent simple meniscus component) is preferably greater than 1.625, whilst the arithmetic mean of the Abbe V numbers of such materials is greater than 50. This assists in the stabilization of chromatic aberrations, astigmatism and field curvature.

It should be mentioned that a surface which at one point in the range of variation contributes strongly towards the control of one type of aberration may at a different point in the range contribute in a different manner, for example to the control of a different type of aberration. It must be recognized therefore that the functions above mentioned for individual features of the movable second and third members are the primary functions for which such features are intended and that in addition they may contribute usefully in co-operation with other features, towards quite different function.

The iris diaphragm of the objective is preferably stationary and located between the third and fourth members of the objective.

A convenient practical example of zoom objective according to the invention is illustrated diagrammatically by way of example in the accompanying drawing.

Numerical data for this example are given in the following table, in which $R_1$ $R_2$ . . . designate the radii of curvature of the individual surfaces of the objective counting from the front, the positive sign indicating that the surface is convex to the front and the negative sign that it is concave thereto, $D_1$ $D_2$ . . . designate the axial thicknesses of the individual elements of the objective, and $S_1$ $S_2$ . . . designate the axial air separations between the components of the objective. The tables also give the mean refractive indices $n_d$ for the $d$-line of the spectrum and the Abbe V numbers of the materials from which the various elements of the objective are made, and in addition the clear diameters of the various surfaces of the objective.

The second section of the table gives the values of the three variable axial air separations between the four members of the objective, when the objective is focussed for infinity, for a number of representative zooming positions, for which the corresponding values of the equivalent focal length F of the complete objective from its minimum value $F_0$ to its maximum value $F_m$ are also given, together with the corresponding values of log F.

The third section of the table gives the equation defining an axial section through an aspheric surface provided in the stationary rear member of the objective.

The dimensions in the table are given in terms of the minimum value $F_0$ of the equivalent focal length of the objective in the range of variation.

The insertion of equal signs (=) in the radius column of the table, in company with the plus signs (+) and minus (−) signs, which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations, including the primary aberrations, but different mathematical sign conventions are required for other purposes, including computation of some of the secondary aberrations, so that a radius indicated for example as positive in the table may have to be treated as negative for some calculations, as is well understood in the art.

| Radius | Thickness or Air Separation | Refractive Index, $n_d$ | Abbe V Number | Clear Diameter |
|---|---|---|---|---|
| $R_1 = +20.5867$ | | | | $R_1 = 2.325$ |
| | $D_1 = 0.1056$ | 1.7847 | 26.10 | |
| $R_2 = +3.5799$ | | | | $R_2 = 2.305$ |
| | $D_2 = 0.4224$ | 1.5168 | 64.20 | |
| $R_3 = -8.1179$ | | | | $R_3 = 2.314$ |
| | $S_1 = $ variable | | | |
| $R_4 = +4.2885$ | | | | $R_4 = 2.284$ |
| | $D_3 = 0.1223$ | 1.6888 | 49.48 | |
| $R_5 = +5.8987$ | | | | $R_5 = 2.246$ |
| | $S_2 = 0.0026$ | | | |
| $R_6 = +3.2612$ | | | | $R_6 = 2.225$ |
| | $D_4 = 0.2668$ | 1.6888 | 49.48 | |
| $R_7 = +15.5358$ | | | | $R_7 = 2.206$ |
| | $S_3 = $ variable | | | |
| $R_8 = +2.6352$ | | | | $R_8 = 1.100$ |
| | $D_5 = 0.033$ | 1.69864 | 55.99 | |
| $R_9 = +0.7174$ | | | | $R_9 = 0.968$ |
| | $D_6 = 0.133$ | 1.78478 | 26.09 | |
| $R_{10} = +1.4174$ | | | | $R_{10} = 0.945$ |
| | $S_4 = 0.117$ | | | |
| $R_{11} = -3.2390$ | | | | $R_{11} = 0.944$ |
| | $D_7 = 0.033$ | 1.69843 | 56.09 | |
| $R_{12} = +1.5127$ | | | | $R_{12} = 0.891$ |
| | $S_5 = $ variable | | | |
| $R_{13} = -1.5600$ | | | | $R_{13} = 0.653$ |
| | $D_8 = 0.093$ | 1.78424 | 26.10 | |
| $R_{14} = -0.6703$ | | | | $R_{14} = 0.663$ |
| | $D_9 = 0.031$ | 1.62304 | 57.05 | |
| $R_{15} = +4.3480$ | | | | $R_{15} = 0.679$ |
| | $S_6 = 0.058$ | | | |
| $R_{16} = -1.3076$ | | | | $R_{16} = 0.679$ |
| | $D_{10} = 0.031$ | 1.69898 | 56.12 | |
| $R_{17} = -7.6946$ | | | | $R_{17} = 0.703$ |
| | $S_7 = $ variable | | | |
| $R_{18} = $ stop | | | | $R_{18} = 0.932$ |
| | $S_8 = 0.02$ | | | |
| $R_{19} = +4.6008$ | | | | $R_{19} = 0.958$ |
| | $D_{11} = 0.128$ | 1.48767 | 69.95 | |
| $R_{20} = -1.9183$ | | | | $R_{20} = 0.970$ |
| | $S_9 = 0.0016$ | | | |
| $R_{21} = +2.7306$ | | | | $R_{21} = 0.991$ |
| | $D_{12} = 0.108$ | 1.51009 | 64.22 | |
| $R_{22} = -3.9054$ | | | | $R_{22} = 0.991$ |
| | $S_{10} = 0.0016$ | | | |
| $R_{23} = $ aspheric | | | | $R_{23} = 0.978$ |
| | $D_{13} = 0.108$ | 1.51009 | 64.22 | |
| $R_{24} = +4.7862$ | | | | $R_{24} = 0.960$ |
| | $S_{11} = 0.0016$ | | | |
| $R_{25} = +1.0558$ | | | | $R_{25} = 0.932$ |
| | $D_{14} = 0.192$ | 1.48767 | 69.95 | |
| $R_{26} = -2.8624$ | | | | $R_{26} = 0.907$ |
| | $D_{15} = 0.057$ | 1.78483 | 26.09 | |
| $R_{27} = +2.0717$ | | | | $R_{27} = 0.856$ |
| | $S_{12} = 0.700$ | | | |
| $R_{28} = +1.1812$ | | | | $R_{28} = 0.621$ |
| | $D_{16} = 0.054$ | 1.69835 | 56.16 | |
| $R_{29} = +0.7017$ | | | | $R_{29} = 0.588$ |
| | $S_{13} = 0.0454$ | | | |
| $R_{30} = +1.8905$ | | | | $R_{30} = 0.588$ |
| | $D_{17} = 0.06$ | 1.70076 | 30.30 | |
| $R_{31} = +7.3882$ | | | | $R_{31} = 0.580$ |

Values of the variable separations $S_3$, $S_5$ and $S_7$ for various values of the equivalent focal length F of the complete objective when focussed for infinity:

| $S_3$ | $S_5$ | $S_7$ | F | log F |
|---|---|---|---|---|
| 0.018 | 2.293 | 0.683 | 1.0 | .0 |
| 1.076 | 1.202 | 0.716 | 2.0 | 0.301 |
| 1.848 | 0.463 | 0.683 | 4.0 | 0.602 |
| 2.406 | 0.110 | 0.479 | 8.0 | 0.903 |
| 2.712 | 0.258 | 0.025 | 16.0 | 1.204 |

Equation for aspheric surfaces $R_{23}$:

$$x = 1.777 - \sqrt{3.160 - y^2} - 0.0089y^4 + 0.0219y^6 - 0.0039y^8 + 0.0676y^{10}$$

In this example, the maximum value $F_m$ of the equivalent focal length of the objective in the range of variation is 16 times the minimum value $F_o$ thereof. The back focal distance from the rear surface of the objective to the image plane is 2.3082 $F_o$.

The objective in this example is designed for use with a rectangular image field having a diagonal 0.64$F_o$ and covers a semi-angular field of view varying from 1.2 degrees at $F_o$ to 17.75 degrees at $F_m$.

The relative aperture in the lower part of the range is $f/4.0$. If this aperture were maintained throughout the whole range, it would involve very large diameters for the front member, which would in its turn make the objective bulky and unwieldy. To avoid this, the objective is so arranged that the relative aperture $f/4.0$ is maintained only up to the position in the range at which the equivalent focal length is 8.5$F_o$, and in the remainder of the range the relative aperture decreases at an approximately linear rate from the value $f/4.0$ to the value $f/7.5$ at the upper end of the range.

The iris diaphragm is stationary and is located behind the movable third member of the objective at a distance 0.02$F_o$ in front of the stationary rear member.

The front member includes the surfaces $R_1$ to $R_7$, the movable second member the surfaces $R_8$ to $R_{12}$, the movable third member the surfaces $R_{13}$ to $R_{17}$ and the stationary rear member the surfaces $R_{19}$ to $R_{31}$.

The equivalent focal length $f_A$ of the front member for an infinitely distant object is $+4.174F_o$, that $f_B$ of the movable second member is $-1.2915F_o$ that $f_C$ of the movable third member is $-1.149F_o$, and that $f_D$ of the stationary rear member is $+1.0775F_o$, the positive and negative signs respectively representing convergence and divergence.

The minimum value of the ratio of the equivalent focal length F to the $f$-number of the objective is 0.25$F_o$, and the equivalent focal lengths $f_B$ and $f_C$ of the two movable members are respectively $-5.17$ and $-4.60$ times such minimum value.

The minimum value of the separation $S_5$ between the two movable members is 0.098$F_o$ and occurs when the equivalent focal length F of the complete objective is 9.225$F_o$, which is 0.577 times the maximum value $F_m$ of the equivalent focal length of the objective.

The movable divergent second member consists of a divergent meniscus doublet component having a divergent element in front of a convergent element, with its air exposed surfaces $R_8$ and $R_{10}$ convex to the front, followed by a divergent biconcave simple component. The equivalent focal length of the doublet component is $-6.65F_o$, which is 5.15$f_B$, and that of the simple component is $-1.47F_o$, which is 1.14$f_B$. During a zooming movement in a direction to increase the equivalent focal length of the objective, this second member moves rearwardly from a starting position and its total travel is 2.09$f_B$.

The movable divergent third member consists of a biconcave divergent doublet component, having a convergent element in front of a divergent element, followed by a meniscus divergent simple component with its air exposed surfaces $R_{16}$ and $R_{17}$ concave to the front. The equivalent focal length of the doublet component is $-2.47F_o$, which is 2.15$f_C$, and that of the simple component is 2.26$F_o$, which is 1.97$f_C$.

As will be clear from the second section of the above table, this third member (during a zooming movement in a direction to increase the equivalent focal length of the objective) at first moves forwardly for a short distance and thereafter moves rearwardly to a position close to the iris diaphragm, the total travel of this member, that is the rearward distance from its starting position to its end position, is 0.658$F_o$ which is 0.57$f_C$.

The front surfaces $R_{11}$ of the simple component in the second member is concave to the front and has radius of curvature numerically 2.29 times that of the rear surface $R_{10}$ of the doublet component in such member, such rear surface being convex to the front. The rear element of such doublet component is made of a material having mean refractive index greater by 0.08614 and Abbe V number less by 29.90 than those of the material of the front element of such doublet component. The radius of curvature of the front surface $R_8$ of such doublet component is numerically about 2.0$f_B$ and that of its rear surface $R_{10}$ is numerically about 1.1$f_B$. The arithmetic mean between the mean refractive indices of the materials of the front element of such doublet component and of the simple component is 1.69854 and the arithmetic mean between the Abbe V number of such two materials is 56.04.

In the divergent doublet component of the third member, the material of convergent front element has mean refractive index greater by 0.16120 and Abbe V number less by 30.95 than those of the material of the divergent rear element. The radius of curvature of the collective internal contact $R_{14}$ in such doublet component is numerically about $0.58f_C$. The rear surface $R_{15}$ of such doublet component is convex to the front and has radius of curvature numerically about 3.3 times that of the front surface $R_{16}$ of the following simple component, such front surface being concave to the front. The arithmetic mean between the mean refractive indices of the materials of the rear element of such doublet component and of the simple component is 1.66101, and the arithmetic mean between the Abbe V numbers of such two materials is 56.59. The radius of curvature of the front surface $R_{16}$ of the simple component of the third member is numerically about $1.1f_C$ and that of the front surface $R_{13}$ of the doublet component thereof is numerically about $1.4f_C$.

The arrangement of the two movable members in this example is such as to give a high standard of stabilization of the various aberrations throughout the zooming range, so that, with a front member designed to give a good standard of stabilization of the aberrations throughout the focussing range, the stabilized aberrations produced by the front three members can be balanced out by suitable design of the stationary rear member.

The front member may be arranged in various ways, but in the example such member is of the kind described in the now abandoned U.S. patent application Ser. No. 312,699, filed Sept. 30, 1963 and, in accordance with the invention thereof, is divided into front and rear portions, focussing to suit different object positions being effected by movement only of its rear portion, its stationary front portion being approximately afocal (that is having an equivalent focal length numerically greater than $4f_A$), whilst the rear portion is convergent with equivalent focal length between $0.75f_A$ and $1.25f_A$.

In the example, the stationary front portion of the front member consists of a doublet component having a divergent element in front of a convergent element with a dispersive internal contact $R_2$, and has equivalent focal length $36.208F_0$ which amounts to $8.67f_A$. The rear member movable for focussing consists of two simple meinscus convergent components with their surfaces convex to the front, and has equivalent focal length $4.719F_0$ which amounts to $1.13f_A$. The air separation $S_1$ between the two portions varies from $0.289F_0$ for an infinitely distant object to $0.004F_0$ for an object at a distance of about $65F_0$ from the front surface of the stationary front portion. It will be clear that the focussing movement of the rear portion of the front member alters the air separation $S_3$, and it should be mentioned that the varying values of $S_3$ given in the second portion of the above table in respect of the zooming movement are those which occur when the rear portion of the front member is occupying the position corresponding to an infinitely distant object.

The stationary rear member may take a variety of different forms, but in the example such member is especially designed to have a strong telephoto characteristic, in order to reduce to a minimum the distance between the iris diaphragm and the image plane and thus to reduce as far as is practicable the forward extension of the zoom objective from the image plane. Thus, such rear member has six components, of which the first three are convergent simple components, the fourth is a doublet component having a convergent element in front of a divergent element, the fifth is a divergent simple component and the sixth is a convergent simple component. This rear member had equivalent focal length $f_D$ equal to $1.078F_0$, and has a magnification of 2.208, giving an axial distance from the diaphragm to the image plane equal to $3.785F_0$ made up of the axial length $1.477F_0$ of the rear member plus the back focal distance $2.308F_0$. This rear member is dimensioned to balance out the stabilized residual aberrations of the front three members, and to assist in this function whilst keeping the axial length of the rear member relatively short, an aspheric surface is used, such aspheric surface preferably being, as in the example, the front surface $R_{23}$ of the third of the front three convergent simple components.

The foregoing example is intended more especially for use in a television camera, with appropriate sealing to suit the different image formats of the various alternative television camera systems. Thus, the Image Orthicon system has an image field diagonal of 1.6 inches with a limiting frequency, set by the transmission system, of approximately 8 lines per millimetre, whilst the corresponding figures for the Plumbicon and Vidicon systems are respectively 0.8 inch and approximately 16 lines per millimetre and 0.625 inch and 20 lines per millimetre. In practice, it is preferable to use the same front three members for all three systems and to provide different rear members having magnifications and equivalent focal lengths suited respectively to the requirements of the different systems. Thus, if the foregoing example, in which the magnification of the stationary rear member is 2.208, is appropriately sealed to suit the image field diagonal of 1.6 inches of the Image Orthicon system, the front three members can be used for the Plumbicon system with a different rear member having a magnification of 1.104, the relative aperture thus being changed from $f/4.0$ (falling off at the upper end of the range to $f/7.5$) to $f/2.0$ (falling off similarly to $f/3.75$), giving the same range of variation of equivalent focal length and suited to an image field diagonal of 0.8 inch.

The invention is not, however, limited to use in a television camera, and with the arrangement just mentioned the same front three members could be used for a 35 millimetre cinematograph camera, with a rear member chosen to suit an image field diagonal of 1.2 inches, or for a 16 millimetre cinematograph camera, with a rear member chosen to suit an image field diagonal of 0.5 inch.

What I claim as my invention and desire to secure by Letters Patent is:

1. An optical objective of the zoom type corrected for spherical and chromatic aberrations, coma, astigmatism, field curvature and distortion, and comprising a convergent first member (counting from the front) which for a given object distance remains stationary during the zooming relative movements, an axially movable divergent second member behind the first member, an axially movable divergent third member behind such second member, the numerical values of the equivalent focal lengths $f_B$ and $f_C$ respectively of the second and third members being substantially equal to 5.17 and 4.60 times the minimum value of the ratio of the equivalent focal length of the complete objective to the $f$-number of the objective in the range of variation, a stationary convergent fourth member behind the third member, wherein the total axial movement of the second member in the range of variation is substantially $2.09f_B$ and the total axial movement of the third member in the range of variation is substantially $0.57f_C$, the minimum axial separation between the second and third members occurring when the equivalent focal length of the complete objective is substantially 0.58 times its maximum value in the range of variation, the movable divergent second member consisting of a divergent meniscus compound front component having its air-exposed surfaces convex to the front and having an equivalent focal length of substantially $5.15f_B$ and a divergent simple rear component having an equivalent focal length of substantially $1.14f_B$, and the movable divergent third member consisting of a divergent compound front component having an equivalent focal length of substantially $2.15f_C$ and a divergent simple meniscus rear component having its air-exposed surfaces concave to the front and having an equivalent focal length of substantially 1.97 $f_C$.

2. An optical objective as claimed in claim 1, having the front surface of the divergent simple rear component of the second member concave to the front with radius of curvature substantially 2.29 times the radius of curvature of the rear surface of the divergent compound front component of such second member.

3. An optical objective as claimed in claim 1, in which the front component of the second member is a doublet component having a divergent element in front of a convergent element with a collective internal contact, the mean refractive index of the material of the rear element of such doublet component exceeding that of the front element thereof by substantially 0.086 and the Abbe V number of the material of the front element of such doublet component exceeding that of the rear element thereof by substantially 29.9.

4. An optical objective as claimed in claim 1, in which the radius of curvature of the front surface of the front component of the second member is substantially 2.0$f_B$ and the radius of curvature of the rear surface of such component is substantially 1.1$f_B$.

5. An optical objective as claimed in claim 1, in which the arithmetic mean between the means refractive indices of the materials of the divergent elements of the second member is substantially 1.699, and the arithmetic mean between the Abbe V numbers of such materials is substantially 56.04.

6. An optical objective as claimed in claim 1, in which the front component of the third member is a doublet component having a convergent element in front of a divergent element with a collective internal contact, the mean refractive index of the material of the front element of such doublet component exceeding that of the rear element thereof by substantially 0.161 and the Abbe V number of the material of the rear element of such doublet component exceeding that of the front element thereof by substantially 30.95.

7. An optical objective as claimed in claim 6, in which the radius of curvature of the internal contact in the doublet component of the third member is substantially 0.58$f_C$, such internal contact being concave to the front.

8. An optical objective as claimed in claim 1, in which the rear surface of the front component of the third member is convex to the front with radius of curvature substantially 3 times that of the front surface of the rear component of such third member.

9. An optical objective as claimed in claim 1, in which the arithmetic mean between the mean refractive indices of the materials of the divergent elements of the third member is substantially 1.661 and the arithmetic mean of the Abbe V numbers of such materials is substantially 56.29.

10. An optical objective as claimed in claim 1, in which the radius of curvature of the front surface of the rear component of the third member is substantially 1.1$f_C$, and the front surface of the front component of such third member is concave to the front with radius of curvature substantially 1.4$f_C$.

11. An optical objective as claimed in claim 1, in which the front component of the second member is a doublet component having a collective internal contact, the radius of curvature of the front surface of such doublet component is substantially 2.0$f_B$, and the radius of curvature of the rear surface of such doublet component is substantially 1.1$f_B$ and also substantially 0.44 times the radius of curvature of the front surface of the rear component of such second member, and the front component of the third member is a doublet component having a collective internal contact concave to the front with radius of curvature substantially 0.58$f_C$ and having its front surface concave to the front with radius of curvature substantially 1.4$f_C$, the radius of curvature of the front surface of the rear component of the third member substantially 1.1$f_C$ and also substantially 0.3 times the radius of curvature of the rear surface of the front component of the third member, such rear surface being convex to the front.

12. An optical objective as claimed in claim 11, in which the doublet component of the second member has a divergent element in front of a convergent element and the doublet component of the third member has a convergent element in front of a divergent element, the mean refractive index of the material of the convergent element exceeding that of the associated divergent element by substantially 0.086 in the second member and by substantially 0.161 in the third member, the Abbe V number of the material of the divergent element exceeding that of the associated convergent element by substantially 29.9 in the second member and by substantially 30.95 in the third member, the arithmetic mean between the mean refractive indices of the materials of the said two divergent elements in said members being substantially 1.680, and the arithmetic mean of the Abbe V numbers of the said two divergent elements being substantially 56.32.

13. In an optical objective of the zoom type comprising a convergent front member which for a given object distance remains stationary during zooming, an axially movable divergent second member behind the front member, an axially movable third divergent member behind the second member, said second and third members being movable in a related manner continuously to vary the equivalent focal length of the objective through a range while keeping constant the position of the image plane, and a stationary convergent rear member behind the third member, the improvement wherein the movable second and third members are constructed substantially in accordance with the following:

| Radius | Thickness or Air separation | Refractive Index |
|---|---|---|
| $R_8=+2.6352$ | $D_5=0.033$ | 1.69864 |
| $R_9=+0.7174$ | $D_6=0.133$ | 1.78478 |
| $R_{10}=+1.4174$ | $S_4=0.117$ | |
| $R_{11}=-3.2390$ | $D_7=0.033$ | 1.69843 |
| $R_{12}=+1.5127$ | $S_5=$ variable | |
| $R_{13}=-1.5600$ | $D_8=0.093$ | 1.78424 |
| $R_{14}=-0.6703$ | $D_9=0.031$ | 1.62304 |
| $R_{15}=+4.3480$ | $S_6=0.058$ | |
| $R_{16}=-1.3076$ | $D_{10}=0.031$ | 1.69898 |
| $R_{17}=-7.6946$ | | |

References Cited

UNITED STATES PATENTS

| | | | |
|---|---|---|---|
| 2,663,233 | 12/1953 | Hopkins | 350—184 |
| 3,045,546 | 7/1962 | Cook | 350—186 |
| 3,348,899 | 10/1967 | Price | 350—184 |
| 3,366,437 | 1/1968 | Moriyana et al. | 350—186 |
| 3,377,119 | 4/1968 | Takano | 350—184 |

JOHN K. CORBIN, Primary Examiner

U.S. Cl. X.R.

350—214